United States Patent
Hayashi

(10) Patent No.: US 10,802,943 B2
(45) Date of Patent: Oct. 13, 2020

(54) PERFORMANCE MANAGEMENT SYSTEM, MANAGEMENT DEVICE, AND PERFORMANCE MANAGEMENT METHOD

(71) Applicant: HITACHI, LTD., Tokyo (JP)

(72) Inventor: Shinichi Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 280 days.

(21) Appl. No.: 15/905,703

(22) Filed: Feb. 26, 2018

(65) Prior Publication Data
US 2019/0073288 A1 Mar. 7, 2019

(30) Foreign Application Priority Data

Sep. 7, 2017 (JP) .................. 2017-171851

(51) Int. Cl.
| | |
|---|---|
| G06F 11/34 | (2006.01) |
| G06F 16/21 | (2019.01) |
| H04L 29/08 | (2006.01) |
| G06F 11/30 | (2006.01) |
| G06F 3/06 | (2006.01) |
| H04L 12/26 | (2006.01) |
| H04L 12/24 | (2006.01) |

(52) U.S. Cl.
CPC ...... *G06F 11/3452* (2013.01); *G06F 11/3034* (2013.01); *G06F 16/217* (2019.01); *H04L 67/1097* (2013.01); *G06F 3/0653* (2013.01); *G06F 11/3495* (2013.01); *H04L 41/142* (2013.01); *H04L 41/147* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 6,035,306 | A * | 3/2000 | Lowenthal | G06F 11/32 |
| 7,590,508 | B1 * | 9/2009 | Saghier | G06Q 10/0639 |
| | | | | 702/182 |
| 9,641,399 | B1 * | 5/2017 | Makrucki | H04L 41/147 |
| 2005/0055370 | A1 * | 3/2005 | Fukuda | G06F 3/0605 |
| 2005/0086263 | A1 * | 4/2005 | Ngai | G06F 16/217 |

(Continued)

FOREIGN PATENT DOCUMENTS

JP 5686904 B2 3/2015

*Primary Examiner* — John C Kuan
(74) *Attorney, Agent, or Firm* — Volpe and Koenig, P.C.

(57) ABSTRACT

A performance management system includes: an information collection function unit configured to collect database utilization information indicating a utilization status of the database and component utilization information indicating a utilization status of components, which are constituent elements of the information system; a related component calculation function unit configured to acquire a component utilization, which is a proportion of an actual usage of the component to a maximum usage of the component, on the basis of the component utilization information and specify a related component related to the performance of the information system among the components on the basis of the component utilization and the database utilization information; and a prediction function unit configured to predict a future performance of the information system on the basis of utilization information of the related component.

13 Claims, 20 Drawing Sheets

(56) References Cited

U.S. PATENT DOCUMENTS

| | | | |
|---|---|---|---|
| 2009/0307597 A1* | 12/2009 | Bakman | G06F 11/008 715/736 |
| 2012/0173477 A1* | 7/2012 | Coutts | G06F 16/217 707/602 |
| 2012/0233310 A1* | 9/2012 | Agarwala | H04L 43/0882 709/224 |
| 2012/0254414 A1* | 10/2012 | Scarpelli | G06F 11/3495 709/224 |
| 2013/0158950 A1* | 6/2013 | Cohen | G06F 17/00 702/176 |
| 2014/0244563 A1 | 8/2014 | Atomori | |
| 2015/0007176 A1* | 1/2015 | Kotani | G06F 9/45533 718/1 |
| 2015/0350019 A1* | 12/2015 | Terayama | H04L 41/0816 709/221 |

* cited by examiner

FIG. 3

| Database configuration information 100 | | | |
|---|---|---|---|
| ~101 | ~102 | ~103 | ~104 |
| Database ID | Server ID | Storage ID | Volume ID |
| Database 1 | DB server 1 | Storage 1 | Volume 1 |
| Database 1 | DB server 1 | Storage 1 | Volume 2 |
| Database 2 | DB server 1 | Storage 1 | Volume 3 |
| : | : | : | : |

FIG. 4

| Storage configuration information 110 | | | | |
|---|---|---|---|---|
| Storage ID<br>111 | Volume ID<br>112 | CPU ID<br>113 | CLPR ID<br>114 | Pool ID<br>115 |
| Storage 1 | Volume 1 | CPU 1 | CLPR 1 | Pool 1 |
| Storage 1 | Volume 2 | CPU 1 | CLPR 1 | Pool 1 |
| Storage 1 | Volume 3 | CPU 2 | CLPR 2 | Pool 1 |
| : | : | : | : | : |

FIG. 5

| LAN configuration information 120 | | |
|---|---|---|
| LAN switch ID (121) | Port ID (122) | Coupling destination ID (123) |
| LAN switch 1 | Port 1 | AP server 1 |
| LAN switch 1 | Port 2 | AP server 2 |
| LAN switch 1 | Port 3 | DB server 1 |
| : | : | : |

FIG. 6

SAN configuration information 130

| SAN switch ID | Port ID | Coupling destination ID |
|---|---|---|
| SAN switch 1 | Port 1 | DB server 1 |
| SAN switch 1 | Port 2 | DB server 2 |
| SAN switch 1 | Port 3 | Storage 1 |
| : | : | : |

| Database utilization information 200 | | | |
|---|---|---|---|
| 〜201 | 〜202 | 〜203 | 〜204 |
| Time point | Database ID | Number of transactions | Transaction response time |
| 2017/1/1 0:00 | Database 1 | 100 | 500 ms |
| 2017/1/1 0:00 | Database 2 | 150 | 2,500 ms |
| 2017/1/1 0:01 | Database 1 | 110 | 550 ms |
| : | : | : | |

FIG. 8

| Time point /211 | Server ID /212 | CPU utilization of database 1 /213 | CPU utilization of database 2 /214 | Total CPU utilization /215 |
|---|---|---|---|---|
| 2017/1/1 0:00 | DB server 1 | 20% | 10% | 30% |
| 2017/1/1 0:01 | DB server 1 | 21% | 10% | 31% |
| 2017/1/1 0:02 | DB server 1 | 22% | 10% | 32% |
| : | : | : | : | : |

Server CPU utilization information 210

FIG. 9

Storage utilization information 220

| Time point | Storage ID | Volume ID | Number of random reads | Number of random writes | Number of sequential reads | Number of sequential writes |
|---|---|---|---|---|---|---|
| 2017/1/1 0:00 | Storage 1 | Volume 1 | 100 | 300 | 0 | 0 |
| 2017/1/1 0:00 | Storage 1 | Volume 2 | 0 | 0 | 40 | 20 |
| 2017/1/1 0:01 | Storage 1 | Volume 1 | 110 | 330 | 0 | 0 |
| : | : | : | : | : | : | : |

| Random read amount | Random write amount | Sequential read amount | Sequential write amount |
|---|---|---|---|
| 10 | 30 | 0 | 0 |
| 0 | 0 | 4 | 2 |
| 11 | 33 | 0 | 0 |
| : | : | : | : |

FIG. 10

| Storage port utilization information 230 | | | | |
|---|---|---|---|---|
| ~231 | ~232 | ~233 | ~234 | ~235 |
| Time point | Storage ID | Port 1 utilization of database 1 | Port 1 utilization of database 2 | Total port 1 utilization |
| 2017/1/1 0:00 | Storage 1 | 30% | 5% | 35% |
| 2017/1/1 0:01 | Storage 1 | 31% | 5% | 36% |
| 2017/1/1 0:02 | Storage 1 | 32% | 5% | 37% |
| : | : | : | | : |

FIG. 11

| | | | | |
|---|---|---|---|---|
| Storage CPU utilization information 240 | | | | |
| ~241 | ~242 | ~243 | ~244 | ~245 |
| Time point | Storage ID | CPU 1 utilization of database 1 | CPU 1 utilization of database 2 | Total CPU 1 utilization |
| 2017/1/1 0:00 | Storage 1 | 10% | 5% | 15% |
| 2017/1/1 0:01 | Storage 1 | 11% | 5% | 16% |
| 2017/1/1 0:02 | Storage 1 | 12% | 5% | 17% |
| : | : | : | | : |

FIG. 12

Storage pool utilization information 250

| Time point (251) | Storage ID (252) | Pool 1 utilization of database 1 (253) | Pool 1 utilization of database 2 (254) | Total pool 1 utilization (255) |
|---|---|---|---|---|
| 2017/1/1 0:00 | Storage 1 | 20% | 10% | 30% |
| 2017/1/1 0:01 | Storage 1 | 21% | 10% | 31% |
| 2017/1/1 0:02 | Storage 1 | 23% | 10% | 32% |
| ⋮ | ⋮ | ⋮ | | ⋮ |

FIG. 13

| | | | | |
|---|---|---|---|---|
| LAN switch utilization information 260 | | | | |
| ~261 | ~262 | ~263 | ~264 | ~265 |
| Time point | LAN switch ID | Port 1 utilization of database 1 | Port 1 utilization of database 2 | Total port 1 utilization |
| 2017/1/1 0:00 | LAN switch 1 | 20% | 10% | 30% |
| 2017/1/1 0:01 | LAN switch 1 | 21% | 10% | 31% |
| 2017/1/1 0:02 | LAN switch 1 | 23% | 10% | 32% |
| : | : | : | | : |

FIG. 14

| | | | | |
|---|---|---|---|---|
| SAN switch utilization information 270 | | | | |
| 271 | 272 | 273 | 274 | 275 |
| Time point | SAN switch ID | Port 1 utilization of database 1 | Port 2 utilization of database 2 | Total port 1 utilization |
| 2017/1/1 0:00 | SAN switch 1 | 20% | 10% | 30% |
| 2017/1/1 0:01 | SAN switch 1 | 21% | 10% | 31% |
| 2017/1/1 0:02 | SAN switch 1 | 23% | 10% | 32% |
| : | : | : | | : |

FIG. 15

| Related component information 65 | | |
|---|---|---|
| Database ID (281) | Date and time (282) | Related component (283) |
| Database 1 | Every Monday 0:00-8:00 | Server CPU 1 |
| Database 1 | Every Monday 0:00-8:00 | Storage CPU 2 |
| Database 1 | Every Monday 8:00-17:00 | Storage Pool 3 |
| : | : | : | ps
PERFORMANCE MANAGEMENT SYSTEM, MANAGEMENT DEVICE, AND PERFORMANCE MANAGEMENT METHOD

BACKGROUND

The present invention relates to a technology for managing the performance of an information processing system.

Regarding prediction of a response time of a database, a technology disclosed in Japanese Patent No. 5686904, for example, is known. In the technology disclosed in Japanese Patent No. 5686904, future utilization of a target system is predicted on the basis of utilization information collected from the target system.

Conventionally, an information system that includes a database (DB) server that receives data read/write commands from applications and a storage that stores databases is known.

A database program operating on a database server receives data read/write commands from applications via a local area network (LAN) switch. The database program transmits data read/write commands to a storage via a storage area network (SAN) switch on the basis of these commands.

Examples of components used by a database program include a DB server CPU and a DB server memory included in a database server, a storage CPU, a storage pool, and a storage port included in a storage, a LAN switch port, and a SAN switch port. When these components are overloaded, a response time of a database program deteriorates. In operational management of an information system having databases, it is requested to predict that the response time of a database program will deteriorate in the future. In order to predict that the response time of a database program will deteriorate in the future, it is necessary to predict that respective components used by the database program will be overloaded.

SUMMARY

Conventionally, in a company which constructs and uses an information system, the information system is constructed in a data center of its own company. In this case, an operation administrator needed to predict whether a component of an information system within the data center of the company will be overloaded. Due to this, the frequency of predicting whether a component of the information system will be overloaded was relatively low.

However, in recent years, a service that offers operational management of an information system to a plurality of companies on behalf of the companies has been proposed. In this case, a service provider who provides operational management of an information system on behalf of a company needs to collect utilization information of information systems of a plurality of customers at a management center and predict whether components of respective information systems will be overloaded.

Due to this, the frequency of executing a process of predicting overload of a component becomes remarkably high as compared to a case in which an information system is operated and managed by its own company. Therefore, there is a problem that a large amount of calculation resource required for the prediction process is required.

An object of the present invention is to provide a technology for reducing a load of managing the performance of an information system.

A performance management system according to an aspect of the present invention is a performance management system for managing a performance of an information system having a database, the performance management system including: an information collection function unit configured to collect database utilization information indicating a utilization status of the database and component utilization information indicating a utilization status of components, which are constituent elements of the information system; a related component computation function unit configured to acquire a component utilization, which is a proportion of an actual usage of the component to a maximum usage of the component, on the basis of the component utilization information and specify a related component related to the performance of the information system among the components on the basis of the component utilization and the database utilization information; and a prediction function unit configured to predict a future performance of the information system on the basis of utilization information of the related component.

Since a related component related to performance of an information system is selected among components, and the future performance of the information system is predicted on the basis of the utilization information of the related component, it is possible to reduce a load of managing the performance of the information system.

BRIEF DESCRIPTION OF THE DRAWINGS

FIG. 3 is a diagram illustrating an example of database configuration information illustrated in FIG. 2;

FIG. 4 is a diagram illustrating an example of storage configuration information illustrated in FIG. 2;

FIG. 5 is a diagram illustrating an example of LAN configuration information illustrated in FIG. 2;

FIG. 6 is a diagram illustrating an example of SAN configuration information illustrated in FIG. 2;

FIG. 7 is a diagram illustrating an example of database utilization information illustrated in FIG. 2;

FIG. 8 is a diagram illustrating an example of server CPU utilization information illustrated in FIG. 2;

FIG. 9 is a diagram illustrating an example of storage utilization information illustrated in FIG. 2;

FIG. 10 is a diagram illustrating an example of storage port utilization information illustrated in FIG. 2;

FIG. 11 is a diagram illustrating an example of storage CPU utilization information illustrated in FIG. 2;

FIG. 12 is a diagram illustrating an example of storage pool utilization information illustrated in FIG. 2;

FIG. 13 is a diagram illustrating an example of LAN switch utilization information illustrated in FIG. 2;

FIG. 14 is a diagram illustrating an example of SAN switch utilization information illustrated in FIG. 2;

FIG. 15 is a diagram illustrating an example of related component information illustrated in FIG. 1;

DETAILED DESCRIPTION OF THE EMBODIMENT

Hereinafter, an embodiment of the present invention will be described with reference to the drawings.

First Embodiment

Figure 1:
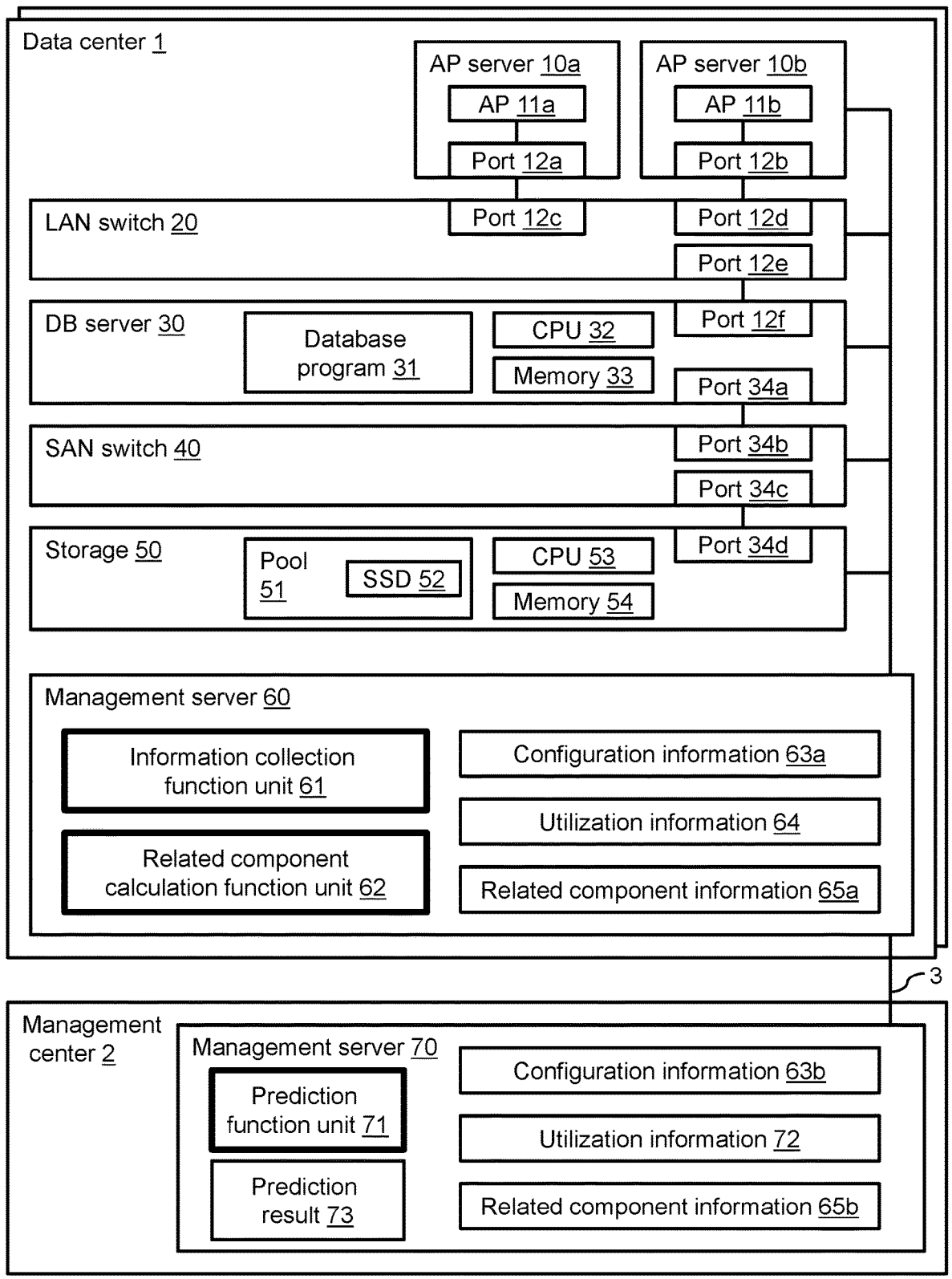
FIG. 1 is a diagram illustrating an embodiment of a performance management system according to the present invention.

FIG. 1 is a diagram illustrating an embodiment of a performance management system of the present invention.

As illustrated in FIG. 1, a performance management system of the present embodiment includes a plurality of data centers 1 provided for respective customers and a management center 2 that manages the plurality of data centers 1 in a centralized manner.

The data center 1 includes application (AP) servers 10a and 10b provided to correspond to applications provided by customers, a LAN switch 20, a DB server 30, a SAN switch 40, a storage 50, and a management server 60.

The AP servers 10a and 10b include APs 11a and 11b and ports 12a and 12b, respectively. The APs 11a and 11b are a customer management program, a data analysis program, and the like and read and write data on the DB server 30. The ports 12a and 12b are interfaces for coupling the APs 11a and 11b to other devices via the LAN switch 20. The number of AP servers is not limited to two as illustrated in the diagram, and three or more AP servers may be provided so as to correspond to applications provided by a customer. In this case, an AP and a port are provided in each of the AP servers.

The LAN switch 20 is a switch that couples the AP servers 10a and 10b and the DB server 30 and has ports 12c to 12e. These ports 12c to 12e are interfaces for coupling the AP servers 10a and 10b and the DB server 30.

The DB server 30 includes a database program 31, a CPU 32, a memory 33, and ports 12f and 34a. The database program 31 is a program for managing data of the APs 11a and 11b and stores the data of the APs 11a and 11b in the storage 50. The CPU 32 is a device that controls the database program 31. The memory 33 is a device that temporarily stores data managed by the database program 31. The port 12f is an interface for coupling to other devices via the LAN switch 20 and the port 34a is an interface for coupling to other devices via the SAN switch 40.

The SAN switch 40 is a switch that couples the DB server 30 and the storage 50 and has ports 34b and 34c. These ports 34b and 34c are interfaces for coupling the DB server 30 and the storage 50. The storage 50 has a pool 51, a CPU 53, a memory 54, and a port 34d. The pool 51 is a storage area formed of a plurality of solid state drives (SSD) 52. The pool 51 may be formed of a hard disk drive (HDD) instead of SSD and may be formed of a combination of SSD and HDD. The CPU 53 is a device that controls read and write of data on the SSD 52. The memory 54 is a device that temporarily stores data.

The performance management system of the present embodiment manages the performance of the information system having the DB server 30 the storage 50 described above using the following configuration. A management server 60 (a first management device) includes an information collection function unit 61, a related component calculation function unit 62, configuration information 63, utilization information 64, and related component information 65a. The information collection function unit 61 collects database utilization information indicating the utilization status of the DB server 30 and component utilization information indicating the utilization status of components such as the CPUs 32 and 53, the memories 33 and 54, the ports 12f, 34a, and 34d, the pool 51, and the SSD 52 which are constituent elements of the DB server 30 and the storage 50, for example. The related component calculation function unit 62 acquires a component utilization which is the proportion of an actual usage of a component to a maximum usage of the component on the basis of the component utilization information collected by the information collection function unit 61 and specifies a related component related to the performance of the information system among components on the basis of the component utilization and the database utilization information collected by the information collection function unit 61. The component utilization is the value of an index related to the use of a component. An actual index is different depending on a component such as a CPU or a memory. The possible maximum value of the index is the maximum usage of the component. The value of an index associated with the use of a component is the actual usage of the component. The proportion of the actual usage to the maximum usage is the component utilization.

The management center 2 has a management server 70 (a second management device).

The management server 70 is coupled to the management server 60 of the data center 1 via a communication network 3. The management server 70 includes a prediction function unit 71, configuration information 63b, utilization information 72, related component information 65b, and a prediction result 73.

The prediction function unit 71 predicts a future performance of the information system on the basis of the utilization information of a related component specified by the related component calculation function unit 62.

Figure 2:
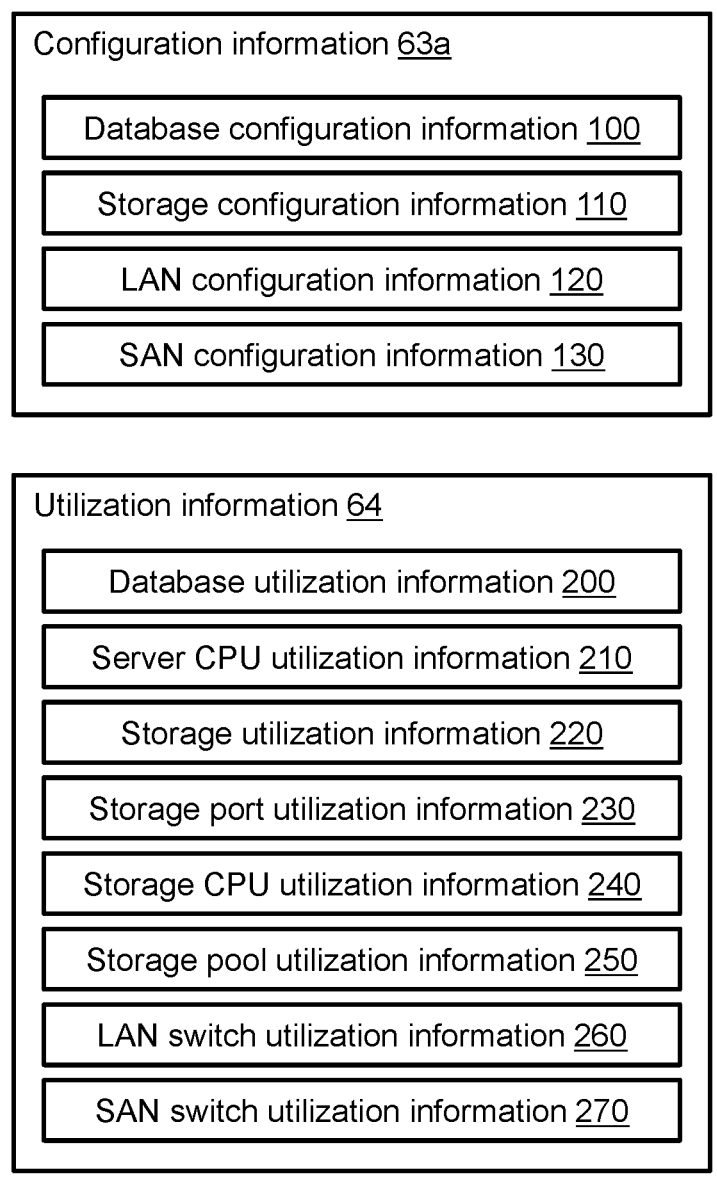
FIG. 2 is a diagram illustrating an example of configuration information and utilization information illustrated in FIG. 1.

FIG. 2 is a diagram illustrating an example of the configuration information 63a and the utilization information 64 illustrated in FIG. 1.

As illustrated in FIG. 2, for example, the configuration information 63a illustrated in FIG. 1 includes database configuration information 100, storage configuration information 110, LAN configuration information 120, and SAN configuration information 130. Moreover, the utilization information 64 illustrated in FIG. includes database utilization information 200, server CPU utilization information 210, storage utilization information 220, storage port utilization information 230, storage CPU utilization information 240, storage pool utilization information 250, LAN switch utilization information 260, and SAN switch utilization information 270, for example.

FIG. 3 is a diagram illustrating an example of the database configuration information 100 illustrated in FIG. 2.

As illustrated in FIG. 3, for example, the database configuration information 100 illustrated in FIG. 2 includes a database ID 101, a server ID 102, a storage ID 103, and a volume ID 104. The database ID 101 is used for identifying a database. The server ID 102 indicates a server on which a database identified by the database ID 101 operates. The storage ID 103 indicates a storage in which data of a database identified by the database ID 101 is stored. The volume ID 104 indicates a volume in which data of a database identified by the database ID 101 is stored.

FIG. 4 is a diagram illustrating an example of the storage configuration information 110 illustrated in FIG. 2.

As illustrated in FIG. 4, for example, the storage configuration information 110 illustrated in FIG. 2 includes a storage ID 111, a volume ID 112, a CPU ID 113, a cache logical partition (CLPR) ID 114, and a pool ID 115. The storage ID 111 and the volume ID 112 are used for identifying a storage and a volume, respectively. The CPU ID 113 indicates a CPU that controls a volume identified by the volume ID 112. The CLPR ID 114 indicates a CLPR in which temporary data of a volume identified by the volume ID 112 is stored. The pool ID 115 indicates a pool in which a volume identified by the volume ID 112 is stored.

FIG. 5 is a diagram illustrating an example of the LAN configuration information 120 illustrated in FIG. 2.

As illustrated in FIG. 5, for example, the LAN configuration information 120 illustrated in FIG. 2 includes a LAN switch ID 121, a port ID 122, and a coupling destination ID 123. The LAN switch ID 121 and the port ID 122 are used for identifying a LAN switch and a port, respectively. The coupling destination ID 123 indicates a server coupled to a port identified by the port ID 122. FIG. 6 is a diagram illustrating an example of the SAN configuration information 130 illustrated in FIG. 2.

As illustrated in FIG. 6, for example, the SAN configuration information 130 illustrated in FIG. 2 includes a SAN switch ID 131, a port ID 132, a coupling destination ID 133. The SAN switch ID 131 and the port ID 132 are used for identifying a SAN switch and a port, respectively. The coupling destination ID 133 indicates a server or a storage coupled to a port identified by the port ID 132.

FIG. 7 is a diagram illustrating an example of the database utilization information 200 illustrated in FIG. 2.

As illustrated in FIG. 7, for example, the database utilization information 200 illustrated in FIG. 2 includes a time point 201, a database ID 202, the number of transactions 203, and a transaction response time 204, and indicates the utilization status of a database. The number of transactions 203 indicates the number of transactions per unit time at a time point 201 of a database identified by the database ID 202, and the transaction response time 204 indicates the response time at that time point.

FIG. 8 is a diagram illustrating an example of the server CPU utilization information 210 illustrated in FIG. 2.

As illustrated in FIG. 8, for example, the server CPU utilization information 210 illustrated in FIG. 2 includes a time point 211, a server ID 212, CPU utilizations 213 and 214 of respective databases, and a total CPU utilization 215. The CPU utilizations 213 and 214 of respective databases indicate the CPU utilizations of respective databases at the time point 211 of a server identified by the server ID 212, and the total CPU utilization 215 indicates a total CPU utilization at that time point.

FIG. 9 is a diagram illustrating an example of the storage utilization information 220 illustrated in FIG. 2.

As illustrated in FIG. 9, for example, the storage utilization information 220 illustrated in FIG. 2 includes a time point 211, a storage ID 222, a volume ID 223, the number of random reads 224, the number of random writes 225, the number of sequential reads 226, the number of sequential writes 227, a random read amount 228, a random write amount 229, a sequential read amount 238, and a sequential write amount 239 and indicates the utilization status of a storage. The storage utilization information 220 indicates the number of accesses for respective access types at the time point 221 of a volume identified by the volume ID 223 using the number of random reads 224, the number of random writes 225, the number of sequential reads 226, the number of sequential writes 227, the random read amount 228, the random write amount 229, the sequential read amount 238, and the sequential write amount 239.

FIG. 10 is a diagram illustrating an example of the storage port utilization information 230 illustrated in FIG. 2.

As illustrated in FIG. 10, for example, the storage port utilization information 230 illustrated in FIG. 2 includes a time point 231, a storage ID 232, port utilizations 233 and 234 of respective databases, and a total utilization 235 of respective ports. The port utilizations 233 and 234 of respective databases indicate the utilizations of respective ports at the time point 231 of a storage identified by the storage ID 232, and the total port utilization 235 indicates the total utilization of respective ports at that time point.

FIG. 11 is a diagram illustrating an example of the storage CPU utilization information 240 illustrated in FIG. 2.

As illustrated in FIG. 11, for example, the storage CPU utilization information 240 illustrated in FIG. 2 includes a time point 241, a storage ID 242, CPU utilizations 243 and 244 of respective databases, and a total utilization 245 of respective CPUs. The CPU utilizations 243 and 244 of respective databases indicate the utilizations of respective CPUs at the time point 241 of a storage identified by the storage ID 242, and the total CPU utilization 245 indicates the total CPU utilization at that time point.

FIG. 12 is a diagram illustrating an example of the storage pool utilization information 250 illustrated in FIG. 2.

As illustrated in FIG. 12, for example, the storage pool utilization information 250 illustrated in FIG. 2 includes a time point 251, a storage ID 252, utilizations 253 and 254 of respective databases and respective pools, and a total utilization 255 of respective pools. The utilizations 253 and 254 of respective databases and respective pools indicate the utilizations of respective pools at the time point 251 of a storage identified by the storage ID 252 and the total pool utilization 255 indicates a total utilization of respective pools at that time point.

FIG. 13 is a diagram illustrating an example of the LAN switch utilization information 260 illustrated in FIG. 2.

As illustrated in FIG. 13, for example, the LAN switch utilization information 260 illustrated in FIG. 2 includes a time point 261, a LAN switch ID 262, utilizations 263 and 264 of respective databases and respective ports, and a total utilization 265 of respective ports. The utilizations 263 and 264 of respective databases and respective ports indicate the utilizations of respective ports by a database at the time point 261 of a LAN switch identified by the LAN switch ID 262, and the total port utilization 265 indicates a total utilization of respective ports at that time point.

FIG. 14 is a diagram illustrating an example of the SAN switch utilization information 270 illustrated in FIG. 2.

As illustrated in FIG. 14, for example, the SAN switch utilization information 270 illustrated in FIG. 2 includes a time point 271, a SAN switch ID 272, utilizations 273 and 274 of respective databases and respective ports, and a total utilization 275 of respective ports. The utilizations 273 and 274 of respective databases and respective ports indicate utilizations of respective ports by a database at the time point 271 of a SAN switch identified by the SAN switch ID 272, and the total port utilization 275 indicates a total utilization of respective ports at that time point.

FIG. 15 is a diagram illustrating an example of the related component information 65*a* illustrated in FIG. 1.

As illustrated in FIG. 15, for example, the related component information 65a illustrated in FIG. 1 includes a database ID 281, a date and time 282, and a related component 283. The related component 283 indicates a component related to a transaction performance at the date and time 282 with respect to a database identified by the database ID 281.

Figure 16:
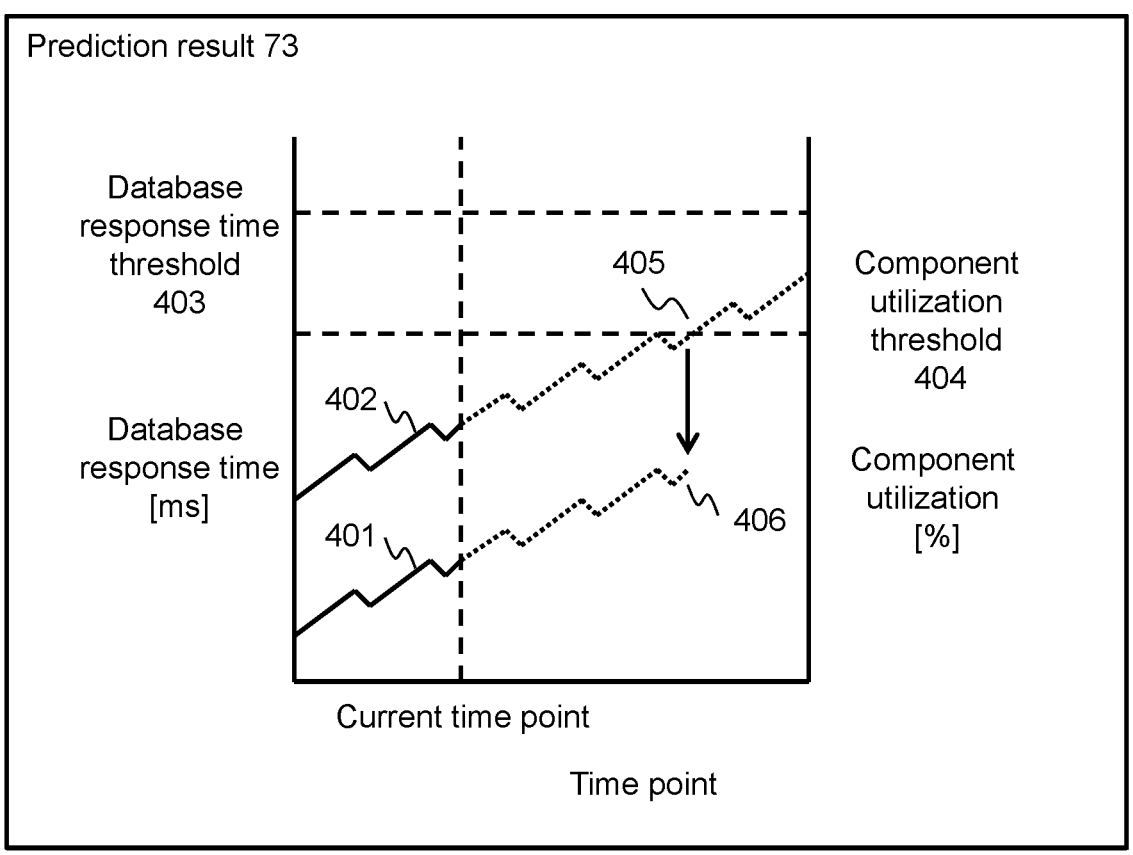
FIG. 16 is a diagram illustrating an example of a prediction result illustrated in FIG. 1.

FIG. 16 is a diagram illustrating an example of the prediction result 73 illustrated in FIG. 1.

In FIG. 16, a vertical axis on the left side of the graph indicates a database response time, a vertical axis on the right side indicates a component utilization, and a horizontal axis indicates a time point. A line graph 401 indicates a database response time, a solid line indicates a past response time, and a broken line indicates a predicted response time. A line graph 402 indicates a component utilization, a solid line indicates a past utilization, and a broken line indicates a predicted utilization. A database response time threshold 403 indicates a threshold of a database response time and is set to a value corresponding to a customer request. A component utilization threshold 404 indicates a threshold of a component utilization and is set to a value corresponding to a customer request.

A performance management method in the performance management system configured in the above-described manner will be described by way of an example of a method of reducing a prediction processing amount in prediction of a database response time as a first embodiment.

In order to manage the performance of an information system having the above-described database, first, a related component related to the performance of a database is specified among components which are constituent elements of the information system. The component is a CPU, a memory, a port, a pool, a SSD, and the like.

Figure 17:
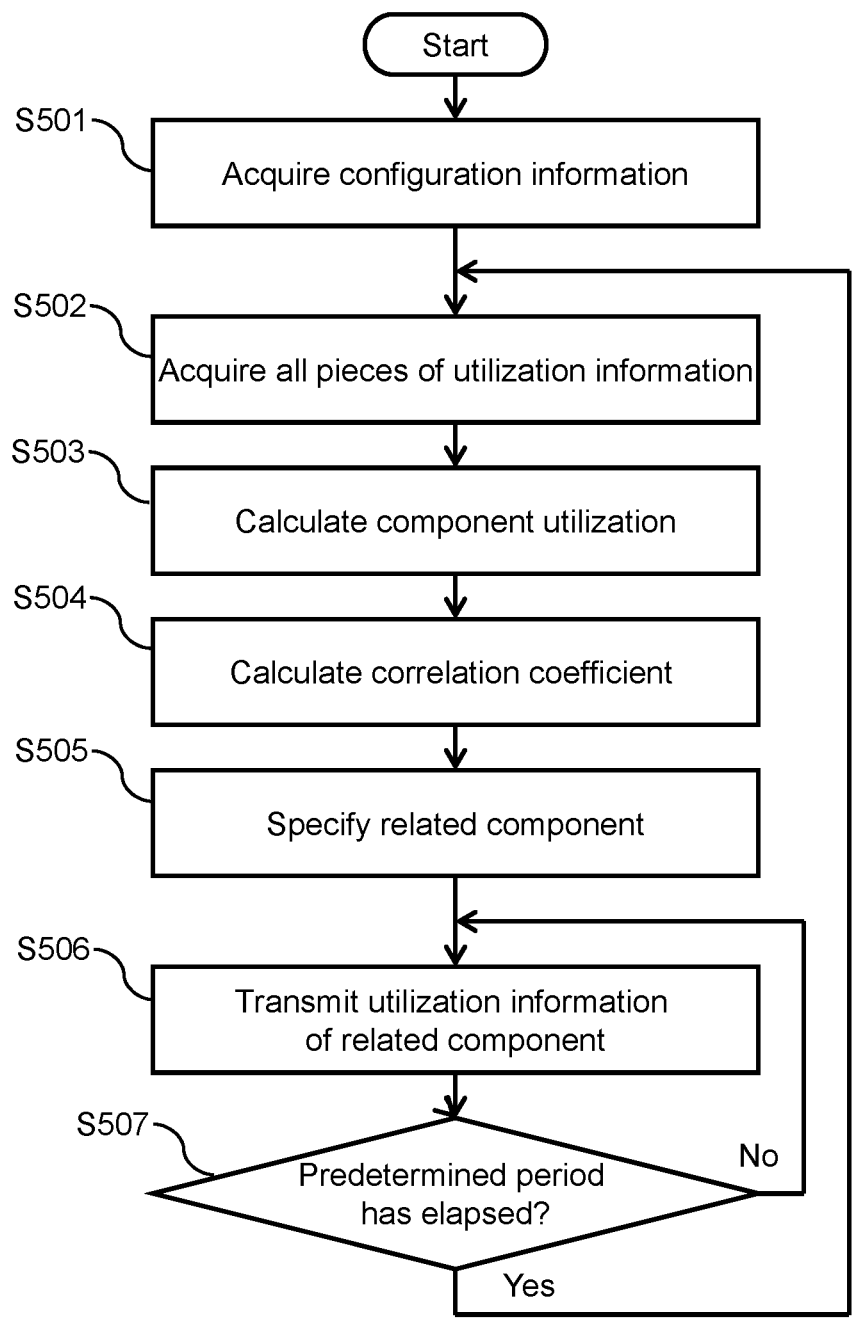
FIG. 17 is a diagram for describing an example of a flow of specifying a related component in the performance management system illustrated in FIG. 1.

FIG. 17 is a diagram for describing an example of a flow of specifying a related component in the performance management system illustrated in FIG. 1.

When a related component is specified in the performance management system illustrated in FIG. 1, first, the information collection function unit 61 acquires configuration information of respective components (step S501). Specifically, the information collection function unit 61 acquires configuration information from the DB server 30 and records the configuration information of the DB server 30 in the database configuration information 100 as illustrated in FIG. 3. Moreover, the information collection function unit 61 acquires configuration information from the storage 50 and records the configuration information of the storage 50 in the storage configuration information 110 as illustrated in FIG. 4.

Furthermore, the information collection function unit 61 acquires configuration information from the LAN switch 20 and records the configuration information of the LAN switch 20 in the LAN configuration information 120 as illustrated in FIG. 5. Furthermore, the information collection function unit 61 acquires configuration information from the SAN switch 40 and records the configuration information of the SAN switch 40 in the SAN configuration information 130 as illustrated in FIG. 6.

Subsequently, the information collection function unit 61 acquires the utilization information of respective components (step S502). Specifically, the information collection function unit 61 acquires utilization information from the database program 31 and records the utilization information of the database program 31 in the database utilization information 200 as illustrated in FIG. 7. Moreover, the information collection function unit 61 acquires server CPU utilization information from the DB server 30 and records the server CPU utilization information of the DB server 30 in the server CPU utilization information 210 as illustrated in FIG. 8. Furthermore, the information collection function unit 61 acquires utilization information from the storage 50 and records the utilization information of the storage 50 in the storage utilization information 220 as illustrated in FIG. 9. Furthermore, the information collection function unit 61 acquires utilization information of the LAN switch 20 and records the utilization information of the LAN switch 20 in the LAN switch utilization information 260 as illustrated in FIG. 13. Furthermore, the information collection function unit 61 acquires utilization information from the SAN switch 40 and records the utilization information of the SAN switch 40 in the SAN switch utilization information 270 as illustrated in FIG. 14.

Subsequently, the related component calculation function unit 62 calculates component utilizations of respective applications (step S503). The component utilization is the proportion of an actual usage of a component resulting from application of a load to a component by an application, to a maximum usage corresponding to a maximum performance of the component. The component utilization can be calculated using a component utilization record which is the component utilization corresponding to the past record of the component. For example, when an application B makes 10 accesses per second with respect to a component A of which the maximum number of accesses is 100 per second, the utilization of the component A by the application B is 10/100=10%. The maximum numbers of accesses to a CPU, a port, and a pool of a storage are calculated by the following equations.

$$\text{(Maximum number of accesses)} = 1/((\text{Access processing time}) + (\text{Data transmission time})) \quad (1)$$

$$\begin{aligned}\text{(Access processing time)} = &(\text{Random read processing time}) \times (\text{Random read rate}) + (\text{Random write processing time}) \times (\text{Random write rate}) + (\text{Sequential read processing time}) \times (\text{Sequential read rate}) + \\&(\text{Sequential write processing time}) \times (\text{Sequential write rate})\end{aligned} \quad (2)$$

$$\begin{aligned}\text{(Data transmission time)} = &(\text{Random read transmission time per unit size}) \times (\text{Random read size}) + (\text{Random write transmission time per unit size}) \times \\&(\text{Random write size}) + (\text{Sequential read transmission time per unit size}) \times (\text{Sequential read size}) + \\&(\text{Sequential write transmission time per unit size}) \times (\text{Sequential write size})\end{aligned} \quad (3)$$

Different values are defined in advance for the respective processing times and the respective transmission times of a CPU depending on a storage model. Moreover, different values are defined in advance for the respective processing times and the respective transmission times of a port depending on a port type and a link speed. Furthermore, different values are defined in advance for the respective processing times and the respective transmission times of a pool depending on a drive type and a RAID level.

The related component calculation function unit 62 calculates the number of random reads, the number of random writes, the number of sequential reads, the number of sequential writes, the random read amount, the random write amount, the sequential read amount, and the sequential write amount which serve as a metric for respective components with respect to each application on the basis of the database configuration information 100, the storage configuration information 110, and the storage utilization information 220.

Subsequently, the related component calculation function unit 62 calculates the random read rate, the random write rate, the sequential read rate, and the sequential write rate from the number of random reads, the number of random writes, the number of sequential reads, and the number of sequential writes. Moreover, the related component calculation function unit 62 calculates the random read size, the random write size, the sequential read size, and the sequential write size from the number of random reads, the number of random writes, the number of sequential reads, the number of sequential writes, the random read amount, the random write amount, the sequential read amount, and the sequential write amount. After that, the related component calculation function unit 62 calculates the access processing time and the data transmission time by substituting the calculation result into equations 2 and 3 and calculates the maximum number of accesses by substituting the calculated access processing time and the calculated data transmission time into equation 1.

After that, the related component calculation function unit 62 calculates the component utilizations of respective applications by equation 4 on the basis of the maximum number of accesses serving as the maximum usage and the current number of accesses serving as the actual usage.

(Component utilization)=(Current number of accesses to component)/(Maximum number of accesses of component)  (4)

By the above-described calculation, the related component calculation function unit 62 calculates a storage port utilization and records the calculation result in the storage port utilization information 230. Moreover, the related component calculation function unit 62 calculates a storage CPU utilization and records the calculation result in the storage CPU utilization information 240. Furthermore, the related component calculation function unit 62 calculates a storage pool utilization and records the calculation result in the storage pool utilization information 250.

As for a component for which the component utilization has been obtained, the related component calculation function unit 62 does not need to perform the above-described calculation. The related component calculation function unit 62 calculates the component utilization on the basis of the component utilization information as described above with respect to a component for which the information corresponding to the component utilization has not been acquired as the component utilization information. Therefore, it is possible to make determination on a related component with respect to a component for which the information corresponding to the component utilization is not obtained.

Subsequently, the related component calculation function unit 62 calculates correlation coefficients between the number of transactions 203 (that is, the number of transactions processed in unit time by a database) in the database utilization information 200, which is an index related to the use of components related to a database, and the utilizations of components related to the database, including the server CPU utilization 213, the storage port utilization 233, the storage CPU utilization 243, the pool utilization 253, the LAN switch port utilization 263, and the SAN switch port utilization 273 (step S504). Since it can be supposed that the operating APs 11a and 11b change depending on the beginning or the end of a month, the day of a week, and a time period, the related component calculation function unit 62 calculates the correlation coefficient for each week of a month, each day of a week, and each time period (time point). In this manner, since the future performance of the information system is predicted using the related component appropriate for respective days of a week and respective time points, it is possible to predict the performance of the information system satisfactorily by the processing of a limited number of components. Moreover, since the number of transactions per unit time is used as an index of the use of a database, it is possible to specify a related component using an index which can be easily acquired in relation to the use of a database.

Subsequently, the related component calculation function unit 62 specifies a component related to the database performance in a certain time period on the basis of the correlation coefficient calculated in step S504 (step S505). For example, a component of which the correlation coefficient is equal to or larger than 0.7 which is a predetermined threshold is specified as a related component related to the database performance. The related component calculation function unit 62 records this result in the related component information 65a. In this manner, since a component of which the utilization status has a strong correlation with the use of a database is specified as the related component, it is possible to predict the performance of the database satisfactorily by performing the prediction process with respect to a limited number of components.

Subsequently, the related component calculation function unit 62 transmits the related component information 65a and the utilization information and the database utilization information 200 of the related component only to the management server 70 of the management center 2 via the communication network 3 (step S506).

Conventionally, since the utilization information of all components is collected from all customers, communication concentrates on the management center and a large line bandwidth is used. Moreover, since the utilization information of all components collected from all customers is stored in the management center, a large storage capacity has to be prepared in the management center. However, in the present embodiment, since the utilization information of the related component only is transmitted via the communication network 3, it is possible to reduce a line cost by reducing a load on lines and to reduce a recording medium cost by reducing the data volume recorded in the management server 70 of the management center 2. The related component calculation function unit 62 executes the process of step S506 at intervals of 1 minute, 10 minutes, or 1 hour, for example. When a predetermined period such as 1 week or 1 month has elapsed after the related component was specified (step S507), the flow returns to step S502, and the process of specifying the related component is executed periodically at a certain period. This is because there is a possibility that a change may occur in the configuration of the information system that manages the performance when 1 week or 1 month has elapsed after the related component was specified. Moreover, even when the configuration of the information system that manages the performance is changed, the flow returns to step S502 and the related component calculation function unit 62 executes the process of specifying the related component. In this way, it is possible to appropriately specify the related component.

On the other hand, when a predetermined period such as 1 week or 1 month has not elapsed after the related component was specified, as described above, the flow returns to step S506, and the utilization information of the related component is transmitted at intervals of 1 minute, 10 minutes, or 1 hour.

Figure 18:
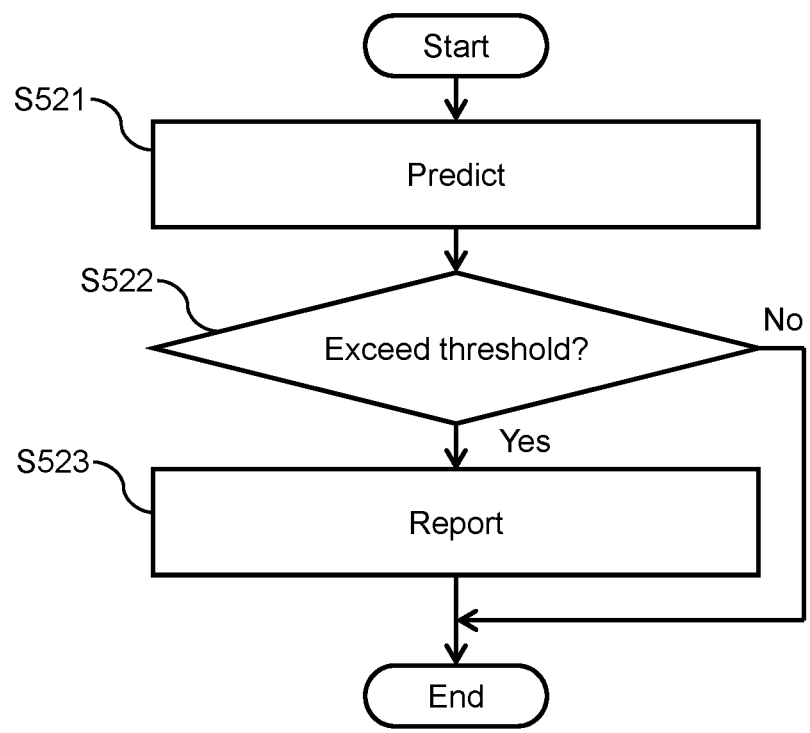
FIG. 18 is a diagram for describing an example of a flow of predicting the performance of a database in the performance management system illustrated in FIG. 1.

FIG. 18 is a diagram for describing an example of a flow of predicting a performance of a database in the performance management system illustrated in FIG. 1.

The performance management system illustrated in FIG. 1 executes the process of predicting the database performance periodically or when the management server 70 of the management center 2 has received the utilization information of the related component transmitted from the management server 60 of the data center 1 in step S506.

The configuration information, the utilization information, and the related component information of the related component transmitted from the management server 60 to the management server 70 in step S506 are recorded in the configuration information 63b, the utilization information 72, and the related component information 65b of the management server 70, respectively.

First, the prediction function unit 71 predicts and calculates the future utilization of the related component on the basis of the utilization information of the related component transmitted in step S506 and recorded in the utilization information 72. Moreover, the prediction function unit 71 predicts and calculates the future transaction response time on the basis of the transaction response time 204 included in the database utilization information 200 of the related component transmitted in step S506 and recorded in the utilization information 72 (step S521). Regression analysis, autoregressive integrated moving average (ARIMA) model, and the like may be used as a method for predicting future time-series information on the basis of past time-series information. In this manner, since the prediction function unit 71 calculates the future utilization of the related component on the basis of the utilization information of the related component and predicts a change in future in the response time of the information system on the basis of the calculated component utilization, the prediction process may be performed for the related component only and the load of the future prediction process of the information system is alleviated.

The prediction function unit 71 records the utilization and the transaction response time predicted in step S521 as the prediction result 73 and determines whether the recorded utilization and the recorded transaction response time exceed predetermined thresholds after the elapse of a predetermined period (step S522).

When the predicted utilization and the predicted transaction response time exceed the predetermined thresholds after the elapse of the predetermined period, the prediction function unit 71 reports that it is predicted that the database response time exceeds a threshold (step S523).

When it is predicted that the database response time does not exceed the threshold, the process ends. In this case, as illustrated in FIG. 16, when it is predicted that the utilization of the related component exceeds the component utilization threshold 404 at a time point 405, since it is supposed that the database response time deteriorates abruptly at a time point 406, it is reported that the database response time deteriorates at the time point 406. The prediction function unit 71 reports these facts using the prediction result 73. In this manner, since it is supposed that the database response time deteriorates abruptly if the component utilization exceeds a predetermined threshold, it is possible to predict a time point at which the responsiveness of the database deteriorates by calculating the time point at which the component utilization exceeds the predetermined threshold.

As described above, the related component related to the performance of the information system is specified among the components which are constituent elements of the information system that manages the performance and the future performance of the information system is predicted on the basis of the utilization information of the related component. Therefore, it is possible to reduce the amount of processing for predicting the future utilization of a component related to the database performance and to reduce the amount of calculation resource to be prepared in the management center 2. When the management server 60 stores the component utilization information collected by the information collection function unit 61 while thinning out the component utilization information of components which are not specified as the related component by the related component calculation function unit 62, it is possible to reduce a necessary storage capacity.

Second Embodiment

In the first embodiment, a performance management method in the performance management system illustrated in FIG. 1 has been described by way of an example of a method of reducing a prediction processing amount in prediction of a database response time. In the second embodiment, a performance management method in the performance management system illustrated in FIG. 1 will be described by way of an example of a method of reducing a prediction processing amount in prediction of a storage response time.

Figure 19:
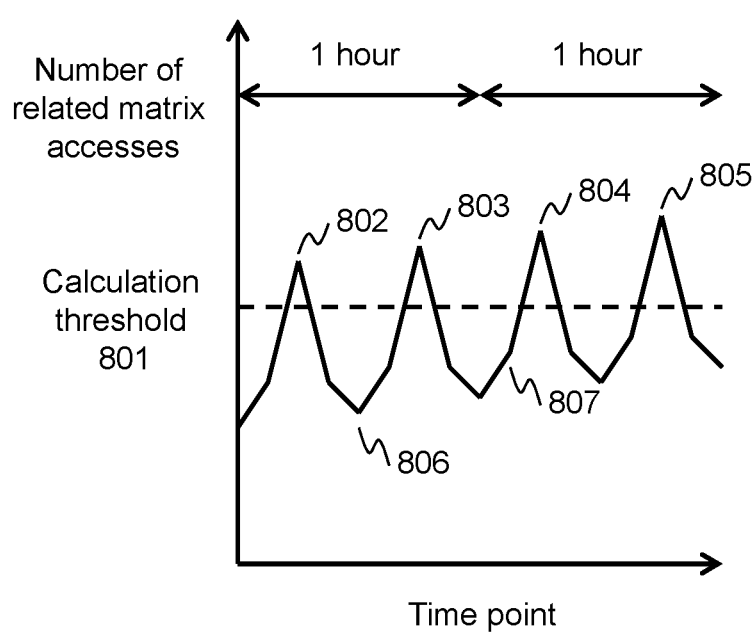
FIG. 19 is a diagram for describing an example of calculated component utilization in the performance management system illustrated in FIG. 1.

FIG. 19 is a diagram for describing an example of calculated component utilization in the performance management system illustrated in FIG. 1.

In FIG. 19, a vertical axis indicates the number of related metric accesses and a horizontal axis indicates a time point. The number of related metric accesses is the number of selected matrices of which the correlation coefficient with the maximum storage performance is equal to or larger than a predetermined threshold among the number of random reads, the number of random writes, the number of sequential reads, the number of sequential writes, the random read amount, the random write amount, the sequential read amount, and the sequential write amount in the storage utilization information 220 illustrated in FIG. 9. A calculation threshold 801 indicates a threshold of the number of accesses.

In the performance management system illustrated in FIG. 1, since the component utilization increases at a time point at which the number of related metric accesses is large, the related component calculation function unit 62 calculates the component utilization at time points 802 to 805 at which the number of related metric accesses exceeds the calculation threshold 801 and does not calculate the component utilization at time points 806 and 807 at which the number of related metric accesses does not exceed the calculation threshold 801. The calculation threshold 801 may a value corresponding to the top 10% time point and may be a value corresponding to 90% of the largest number of related metric accesses.

Figure 20:
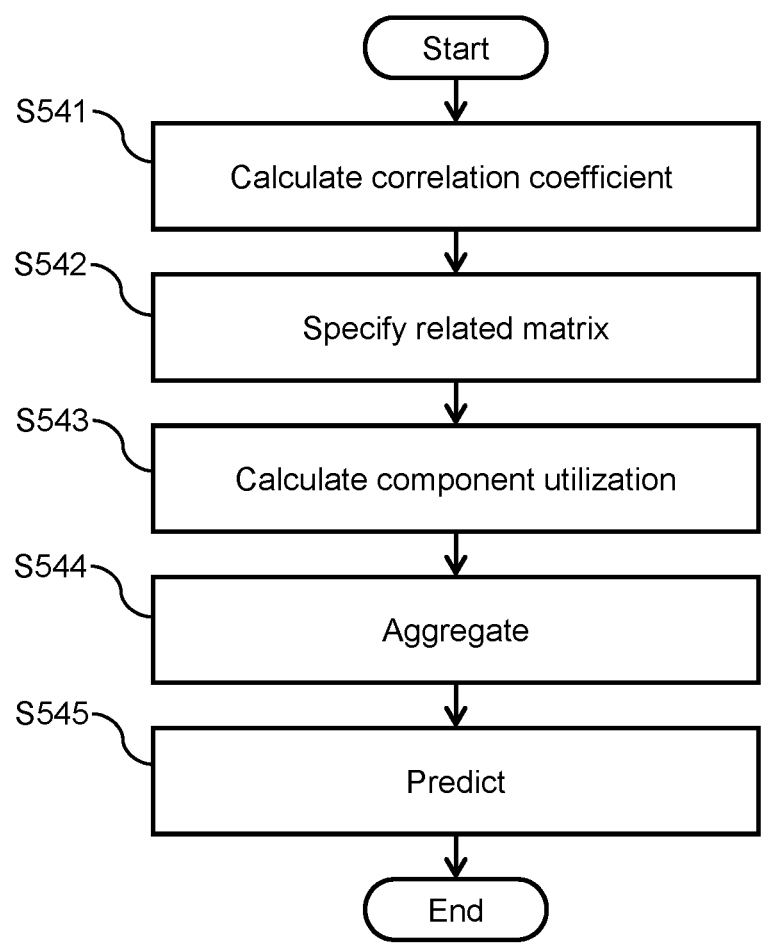
FIG. 20 is a diagram for describing an example of a flow of predicting a storage response time in the performance management system illustrated in FIG. 1.

FIG. 20 is a diagram for describing an example of a flow of predicting a storage response time in the performance management system illustrated in FIG. 1.

When a storage response time is predicted in the performance management system illustrated in FIG. 1, first, the related component calculation function unit 62 calculates a correlation coefficient between the maximum number of accesses of a component corresponding to a maximum storage performance and the matrices used in equations 1 to 3 (step S541).

Subsequently, the related component calculation function unit 62 specifies a metric related to the maximum number of accesses of a component as a related metric on the basis of the correlation coefficient calculated in step S541 (step S542). For example, a metric of which the correlation coefficient is equal to or larger than 0.7 is specified as a related metric.

Subsequently, the related component calculation function unit 62 calculates the component utilization (step S543). In this case, the related component calculation function unit 62 calculates the component utilization at time points at which the number of related metric accesses exceeds the calculation threshold 801 only.

Subsequently, the related component calculation function unit 62 calculates the maximum value of the component utilizations at respective data intervals on the basis of the component utilization calculation in step S543 (step S544). For example, when a data interval is 1 hour, pieces of data obtained every 1 minute are aggregated to pieces of data obtained every 1 hour.

After that, the component utilization is transmitted from the data center 1 to the management center 2 via the communication network 3, and the prediction function unit 71 of the management server 70 predicts the storage response time and the related component utilization and sends a report when the predicted values exceed thresholds (step S545).

In this manner, by calculating the component utilization at time points at which the number of related metric accesses exceeds a predetermined calculation threshold, it is possible to reduce the number of times of calculating the component utilization of the storage.

What is claimed is:

1. A performance management system for improving management and performance of an information system having a database, the performance management system comprising:
    at least one memory;
    at least one input/output device; and
    at least one processor communicatively coupled to the database, the memory and the input/output device;
    a first management device on which the at least one processor is mounted; and
    a second management device which is coupled to the first management device via a communication network, and on which a second processor is mounted, the at least one processor configured to:
        collect database utilization information indicating a utilization status of the database and component utilization information indicating a utilization status of a plurality of components, which are constituent elements of the information system,
        calculate, for each of the plurality of components, a plurality of values, a plurality of rate values and a plurality of size values,
        calculate a data transmission time for each of the plurality of components using the plurality of values, the plurality of rate values and the plurality of size values,
        calculate a component utilization for each of the plurality of components, which is a proportion of an actual usage of each of the plurality of components to a maximum usage of each of the plurality of components,
        calculate a correlation coefficient for each of the plurality of components,
        select one of the plurality of components as a related component related to the performance of the information system among the plurality of components on the basis of the component utilization and the database utilization information,
        predict by calculating a future performance of the information system on the basis of utilization information of the related component,
        determine if the predicted future performance exceeds a predetermined threshold, and
        output the determination and deterioration,
    wherein the first management device transmits, to the second management device, only the utilization information of the related component among pieces of utilization information of the components.

2. The performance management system according to claim 1, wherein
    the at least one processor calculates the correlation coefficient between the component utilization and an index related to a use of the database based on the database utilization information and selects a component, of which the correlation coefficient is equal to or larger than a predetermined threshold, as the related component.

3. The performance management system according to claim 2, wherein
    the index related to the use of the database is a number of transactions processed in unit time by the database.

4. The performance management system according to claim 2, wherein
    the at least one processor calculates the correlation coefficient at a predetermined time point each day of a week and specifies the related component for each day of a week and at each predetermined time point, and
    the at least one processor predicts, each day of a week and at each predetermined time point, the future performance of the information system on the basis of the utilization information of the related component.

5. The performance management system according to claim 1, wherein
    the at least one processor calculates, with respect to a component for which information corresponding to the component utilization is not acquired as the component utilization information, the component utilization on the basis of the component utilization information.

6. The performance management system according to claim 5, wherein
    the at least one processor calculates the component utilization only at time points, at which a number of accesses of a component exceeds a predetermined threshold, on the basis of the component utilization information collected by the at least one processor.

7. The performance management system according to claim 1, wherein
    the at least one processor calculates a future component utilization of the related component on the basis of the utilization information of the related component and predicts a change, in a future, in a response time of the information system on the basis of the calculated future component utilization.

8. The performance management system according to claim 7, wherein
    the at least one processor calculates a time point at which the calculated component utilization exceeds a predetermined threshold.

9. The performance management system according to claim 1, wherein
    the at least one processor executes a process of specifying the related component periodically at fixed intervals and executes the process further when a configuration of the information system is changed.

10. The performance management system according to claim 1, wherein
of the component utilization information the component utilization information of components, which are not the related component, is stored after thinning out the same.

11. The performance management system according to claim 1, wherein
the plurality of values are calculated based on the database utilization information and the component utilization information,
the plurality of rate values for each of the plurality of components are calculated using the plurality of values, and
the plurality of size values for each of the plurality of components are calculated using the plurality of values.

12. A management device collecting information from an information system in a performance management system for improving management and performance of the information system having a database, the management device comprising:
at least one memory;
at least one input/output device; and
at least one processor communicatively coupled to the database, the memory and the input/output device;
a first management device on which the at least one processor is mounted; and
a second management device which is coupled to the first management device via a communication network, and on which a second processor is mounted, the at least one processor configured to:
collect database utilization information indicating a utilization status of the database and component utilization information indicating a utilization status of a plurality of components, which are constituent elements of the information system,
calculate, for each of the plurality of components, a plurality of values, a plurality of rate values and a plurality of size values,
calculate a data transmission time for each of the plurality of components using the plurality of values, the plurality of rate values and the plurality of size values,
acquire a component utilization for each of the plurality of components, which is a proportion of an actual usage of each of the plurality of components to a maximum usage of each of the plurality of components,
calculate a correlation coefficient for each of the plurality of components,
select one of the plurality of components as a related component related to the performance of the information system among the plurality of components on the basis of the component utilization and the database utilization information,
predict by calculating a future performance of the information system on the basis of utilization information of the related component,
determine if the predicted future performance exceeds a predetermined threshold, and
output the determination and deterioration,
wherein the first management device transmits, to the second management device, only the utilization information of the related component among pieces of utilization information of the components.

13. A performance management method for managing a performance of an information system having a database including at least one memory, at least one input/output device, at least one processor, a first management device on which the at least on processor is mounted and a second management device which is coupled to the first management device via a communication network, and on which a second processor is mounted, the performance management method comprising:
collecting database utilization information indicating a utilization status of the database and component utilization information indicating a utilization status of a plurality of components, which are constituent elements of the information system;
calculating, for each of the plurality of components, a plurality of values, a plurality of rate values and a plurality of size values;
calculating a data transmission time for each of the plurality of components using the plurality of values, the plurality of rate values and the plurality of size values;
calculating a component utilization for each of the plurality of components, which is a proportion of an actual usage of each of the plurality of components to a maximum usage of each of the plurality components;
calculating a correlation coefficient for each of the plurality of components;
selecting one of the plurality of components as a related component related to the performance of the information system among the plurality of components on the basis of the component utilization and the database utilization information;
predicting by calculating a future performance of the information system on the basis of utilization information of the related component;
determining if the predicted future performance exceeds a predetermined threshold; and
outputting the determination and deterioration,
wherein the first management device transmits, to the second management device, only the utilization information of the related component among pieces of utilization information of the components.

* * * * *